US010870379B1

(12) United States Patent
Grieger (10) Patent No.: US 10,870,379 B1
(45) Date of Patent: Dec. 22, 2020

(54) BELT FRAMEWORK FOR A VEHICLE SEAT OR A VEHICLE-SEAT BENCH

(71) Applicant: Aguti Produktentwicklung & Design GmbH, Langenargen (DE)

(72) Inventor: Andreas Grieger, Kressbronn (DE)

(73) Assignee: Aguti Produktentwicklung & Design GmbH, Langenargen (DE)

( * ) Notice: Subject to any disclaimer, the term of this patent is extended or adjusted under 35 U.S.C. 154(b) by 0 days.

(21) Appl. No.: 16/547,731

(22) Filed: Aug. 22, 2019

(51) Int. Cl.
*B60N 2/68* (2006.01)
*B60R 22/22* (2006.01)

(52) U.S. Cl.
CPC .............. *B60N 2/688* (2013.01); *B60R 22/22* (2013.01)

(58) Field of Classification Search
CPC ................................ B60N 2/688; B60R 22/22
USPC .......................................................... 297/468
See application file for complete search history.

(56) References Cited

U.S. PATENT DOCUMENTS

| | | | | | |
|---|---|---|---|---|---|
| 2,740,642 | A | * | 4/1956 | Atwood | B60R 21/06 280/801.1 |
| 2,833,554 | A | * | 5/1958 | Ricordi | B60R 21/02 280/751 |
| 2,891,804 | A | * | 6/1959 | Frayne | B62D 25/00 280/805 |
| 3,451,719 | A | * | 6/1969 | De Lorean | B60R 22/18 297/468 |
| 3,762,505 | A | * | 10/1973 | Morse | B60R 22/26 188/371 |
| 3,885,810 | A | * | 5/1975 | Chika | B60N 2/06 280/748 |
| 3,961,807 | A | * | 6/1976 | Maki | B60R 22/023 280/807 |
| 4,350,369 | A | * | 9/1982 | Chika | B60R 22/14 280/804 |
| 5,056,848 | A | * | 10/1991 | Fekete | B60N 2/00 296/63 |
| 5,328,231 | A | * | 7/1994 | Raymond | A47C 1/12 297/13 |

(Continued)

FOREIGN PATENT DOCUMENTS

| | | |
|---|---|---|
| DE | 43 16 930 A1 | 10/1993 |
| DE | 196 52 939 C1 | 1/1998 |

(Continued)

OTHER PUBLICATIONS

German Search Report (Application No. 10 2017 103 778.0) dated Dec. 1, 2017.

(Continued)

*Primary Examiner* — Mark R Wendell
(74) *Attorney, Agent, or Firm* — Burr & Brown, PLLC (57) ABSTRACT

A belt framework for a vehicle seat or a vehicle-seat bench, wherein the belt framework comprises a vertical support and a horizontally running transverse strut, wherein the transverse strut is arranged on the vertical support, wherein a component of a passenger-restraint system is fastened on an attachment element of the transverse strut when the vehicle seat and the belt framework are in an assembled state. The belt framework is distinguished in that the belt framework comprises a safety element, wherein the safety element is present on the transverse strut, along a longitudinal axis of the transverse strut, wherein the safety element, together with the transverse strut, encloses the vertical supports.

14 Claims, 4 Drawing Sheets

(56) References Cited

U.S. PATENT DOCUMENTS

| | | | | |
|---|---|---|---|---|
| 5,362,129 A * | 11/1994 | Itoh | ........................ | B60N 2/803 |
| | | | | 297/391 |
| 5,452,941 A * | 9/1995 | Halse | ..................... | B60N 2/688 |
| | | | | 297/452.2 |
| 5,868,452 A | 2/1999 | Grieger | | |
| 6,533,320 B1 * | 3/2003 | Langensiepen | ......... | B60R 22/02 |
| | | | | 280/801.1 |
| 6,585,325 B1 * | 7/2003 | Pal | ......................... | B60R 22/26 |
| | | | | 297/452.2 |
| 6,767,055 B1 * | 7/2004 | Sparks | ................... | B60N 2/162 |
| | | | | 297/216.13 |
| 7,438,354 B2 * | 10/2008 | Moffa | .................... | B60N 2/242 |
| | | | | 297/14 |
| 7,597,395 B2 * | 10/2009 | Wiedeman | ............... | B60N 2/68 |
| | | | | 296/64 |
| 8,573,649 B2 * | 11/2013 | Baccelli | .................. | B60R 21/20 |
| | | | | 280/808 |
| 8,579,349 B1 * | 11/2013 | Schlangen | ............. | B60N 2/821 |
| | | | | 296/63 |
| 8,628,135 B2 * | 1/2014 | Valasin | .............. | B60N 2/01583 |
| | | | | 296/65.03 |
| 9,010,865 B2 * | 4/2015 | Valasin | ................... | B60R 22/26 |
| | | | | 297/452.18 |
| 10,166,896 B2 * | 1/2019 | Karube | ................... | B60R 22/26 |

FOREIGN PATENT DOCUMENTS

| | | |
|---|---|---|
| DE | 10 2006 007 383 A1 | 9/2007 |
| DE | 10 2014 003 966 A1 | 9/2015 |
| DE | 10/2017103778 * | 8/2018 |

OTHER PUBLICATIONS

European Search Report (Application No. 18153894.3) dated Jul. 19, 2018.

* cited by examiner

Detail B
Fig. 5

Detail B
Fig. 6

Detail B
Fig. 7

Detail B
Fig. 8

BELT FRAMEWORK FOR A VEHICLE SEAT OR A VEHICLE-SEAT BENCH

FIELD OF THE INVENTION

The present application relates to a belt framework for a vehicle seat or a vehicle seat bench.

BACKGROUND OF THE INVENTION

Apparatuses for fitting a passenger-restraint system in a means of transport, for example, for fitting a passenger-protection safety-belt arrangement and components of an associated passenger seat in the means of transport, are known.

Means of transport such as vehicles, for example, passenger vehicles, minibuses, recreational vehicles or camper vans, comprise such apparatuses in the form of a structural unit for installation in the vehicle interior once the vehicle has been produced. The apparatus with the passenger-restraint system present thereon has to be configured for maximum-loading situations which occur in the vehicle, in particular, in conjunction with road-traffic accidents.

The apparatus has to be configured to meet, in particular, safety-related and stability-related criteria, which are necessary, for example, in order for the apparatus, or the vehicle, to be authorized. It is a particular challenge here to provide for cost-effective and economically advantageous design and production of the apparatus.

SUMMARY OF THE INVENTION

The object of the present invention is to provide an apparatus of the type described in the introduction, or a passenger-seat arrangement for a vehicle, in a technically and economically advantageous manner. In particular, it should be possible for stability-related criteria to be met reliably and, as far as production is concerned, advantageously.

The present invention proceeds from a belt framework for a vehicle seat or a vehicle-seat bench, wherein the belt framework comprises a vertical support and a horizontally running transverse strut, wherein the transverse strut is arranged on the vertical support, wherein a component of a passenger-restraint system is fastened on an attachment element of the transverse strut when the vehicle seat and belt framework are in an assembled state.

The belt framework comprises advantageously two, in particular, three, vertical supports, wherein the vertical supports are present, for example, in a spaced-apart state. The transverse strut preferably connects the plurality of vertical supports to one another. The vertical supports are advantageously present in a laterally or horizontally spaced-apart state. It is possible, if appropriate, for the vertical supports to be connected to one another in the foot region thereof, e.g. by a transverse strut, which can provide for fixing on the vehicle structure, specifically on the floor region of the vehicle.

A transverse strut is of preferably continuous design and projects horizontally or laterally preferably on the one vertical strut or on the plurality of vertical struts, for example, on either side or on one side of the same. Accordingly, the transverse strut is usually longer than a set-up dimension of, or an, in particular, lateral distance between, in particular, two vertical supports.

Such a belt framework is designed, in particular, in the form of a mounting apparatus of frame-like design, comprising openings which are surrounded by, in particular, elongate, interconnected profiles which are oriented parallel to one another and at an angle to one another. The profiles consist preferably of a metallic material.

It is, for example, the case that the belt framework also comprises fitting means for fitting the belt framework on a structure of the vehicle, in the region of a vehicle floor. The belt framework is preferably configured, and designed, so as to be fastened in the vehicle, or in a motor vehicle, on a portion of the floor thereof. The fitting means are preferably designed to fit the belt framework with releasable or non-releasable fixing on the vehicle structure, e.g. a vehicle frame. For example, when it has been arranged on the vehicle, the belt framework is screwed and/or welded to the vehicle structure by way of the fitting means. The fitting means of the belt framework for fitting to a structure of a vehicle in the region of a vehicle floor are formed, for example, at the foot region of the belt framework.

The vehicle is designed, for example, in the form of an automobile, in the form of a bus, in the form of a recreational vehicle or in the form of a camper van. The belt framework advantageously forms a basic structure for a seat arrangement in the vehicle, or for a vehicle-seat arrangement.

A passenger-restraint system is advantageously designed in the form of a safety-belt arrangement, e.g. in the form of a multi-point-belt safety system or of a three-point-belt safety system. It is preferably possible for a component of the passenger-restraint system to be fitted on the belt framework. Such a component is present, for example, in the form of a belt retractor, of a belt-deflection arrangement for altering the direction of the belt guided past the same, of a means for fixing a belt end or of a belt buckle, on which it is possible to latch in in a releasable manner an insertion part, by which the belt can be pulled out in loop form.

The belt framework proposed has to be configured in constructional and mechanical terms so as to be able to counteract a maximum-tolerance or maximum possible loading, in particular, in the case of dynamic loading operations, with a sufficient resistance, that is to say so as to be able to absorb, and transfer, corresponding forces and moments.

This is a prerequisite of maintaining the safety of a passenger who can be secured by a safety-belt arrangement, wherein the safety-belt arrangement is accommodated, together with elements of a corresponding passenger seat, on the belt framework, which is fixed in the vehicle. Accordingly, the belt framework is configured preferably so as to form an inner frameworks structure of a passenger seat, which is fixed in the vehicle.

For a comparatively higher level of stability of the belt framework, e.g. for extending the use thereof to a passenger seat having two or more seating positions, the belt framework can comprise, for example, precisely two or precisely three parallel, e.g. spaced-apart, vertical supports, wherein the vertical supports are of preferably identical construction. The two vertical supports are preferably connected to a horizontally arranged transverse strut.

In the case of a typical belt framework according to the present invention having two or three vertical supports, which can be set up vertically in the vehicle, and having a horizontally directed transverse strut, the length of the vertical supports or the height of the belt framework in the installed state is approximately 1.1 meters to approximately 1.3 meters, wherein the vertical supports, in particular, the two outer vertical supports, are spaced apart laterally from one another over a distance of, for example, approximately 0.3 to 0.4 meters. The transverse strut is preferably around approximately 0.7 to 0.9 meters in length.

The vertical support and/or the transverse strut are/is advantageously designed in the form of a hollow profile. The hollow profile is typically rectangular or square in cross section, but it is also conceivable for the hollow profile to be round or elliptical in cross section. The cross section of the hollow profile has a typical length and/or width dimension, or side dimension, of approximately 20 to 40 millimeters. A wall thickness of the hollow profile is usually in a single-digit millimeter range. It is also conceivable for the hollow profile to be present in the form of a multiple hollow profile.

It is also conceivable for the hollow profile, in particular, the vertical support, to have a material cutout, e.g. a slot formation, which is designed in the form of a predetermined bending location in the event of the belt framework being subjected to loading, e.g. in the event of the vehicle being involved in a crash. This makes it possible to influence, in particular, predetermine plastic deformation behavior of the vertical support in the event of loading. The cutout on the vertical support advantageously extends, in particular, in the horizontal direction over a front side of the vertical support and over at least one lateral vertical-support region adjoining the front side. In particular, the material cutout extends, in part, over the front side and over two opposite lateral vertical-support regions, which adjoin the front side laterally. The front side should be understood in relation to a state in which the belt framework has been fitted in the vehicle.

Accordingly, a vehicle seat or passenger seat which can be formed with the belt framework has a seat structure with a seat surface which is located on the front side of the passenger seat and therefore on the front side of the belt framework, or the front side of the vertical support and/or a front side of the transverse strut, wherein the front side of the vertical support and the front side of the transverse strut are advantageously oriented in the direction of travel F.

When the belt framework has been mounted in the vehicle, the relevant loading direction usually corresponds to a seating direction of the secured passenger or the direction of travel F of the vehicle. A vehicle is subjected to maximum loading, for example, in the event of the traveling vehicle striking against an obstruction, in the event of a crash. On account of the braked mass of the passenger sitting, and secured, in the vehicle, the belt framework is subjected to a sudden tensile force, or a moment resulting therefrom, in the loading direction or in the direction of travel F via the safety belts of the passenger-restraint system.

A significant aspect of the present invention, then, can be seen in that the belt framework comprises a safety element, wherein the safety element is present on the transverse strut, along a longitudinal axis of the transverse strut, wherein the safety element, together with the transverse strut, encloses the vertical support. This means that, in the event of the vehicle crashing, a stability level of the transverse strut is increased in comparative terms. This advantageously means that the transverse strut can be formed with a comparatively lower weight, in particular, when taken together with the safety element.

The safety element, together with the transverse strut, encloses the vertical supports in particular around the circumference, for example, in a sling-like manner. It is advantageously the case that a longitudinal axis of the safety element is formed parallel to the longitudinal axis of the transverse strut. When it has been installed on the belt framework, the safety element is present for example in a banana-like manner, e.g. in a curved and/or angled state. The safety element is present, for example, at a rear region of the belt framework, wherein the rear region is located opposite, and at a distance apart from, a front region of the belt framework, the front region being oriented in the direction of travel F. When it has been arranged on the belt framework, the safety element is advantageously present in abutment against the vertical support, in particular, in abutment against a rear side of the vertical support.

Furthermore, it is advantageous for two spaced-apart fastening regions to be present on the transverse strut, wherein the safety element is connected to the transverse strut, in particular, in a non-releasable manner, at the fastening regions. This means that the safety element can absorb, and possibly transfer, tensile forces to which the transverse strut is subjected, for example, by the component of the passenger-restraint system in the event of a crash.

It is preferably the case that the two fastening regions, a first and a second fastening region, are present at opposite ends of the transverse strut, wherein the ends of the transverse strut for example project freely from the vertical support. It is also conceivable for more than two fastening regions, e.g. three or four fastening regions, to be present. The fastening regions are advantageously present on a rear side of the transverse strut. The rear side of the transverse strut is located opposite, and at a distance apart from, the front side of the transverse strut. When the belt framework has been arranged on the vehicle seat and/or on the vehicle, the rear side of the transverse strut, in particular, a surface normal of the rear side of the transverse strut, is advantageously oriented in the direction of the rear of the vehicle, e.g. counter to the direction of travel F of the vehicle. When the belt framework has been arranged in position, the front side of the transverse strut is oriented in the opposite direction, e.g. in the direction of the front of the vehicle or in the direction of travel F. The transverse strut preferably has its rear side fastened on the front side of the vertical support.

The safety element is advantageously connected to the transverse strut, at the fastening regions, at opposite ends of the safety element. For example, the safety element is connected exclusively to the transverse strut, in particular, exclusively at the fastening regions. The safety element is, for example, welded, screwed, soldered, adhesively bonded and/or riveted to the transverse strut, at the fastening regions. The safety element advantageously has, along its longitudinal axis, a length which is smaller than a length of the transverse strut along a longitudinal axis of the transverse strut.

It is also proposed that, when the belt framework has been installed on a vehicle seat and/or a vehicle, the safety element should be present on a side of the transverse strut which is opposite to the seating direction of the vehicle seat and/or to the direction of travel of the vehicle, for example, on the rear side of the transverse strut. When the belt framework has been arranged on the vehicle seat, the safety element is advantageously present on the belt framework in a location opposite to a seat surface of the vehicle seat. As a result, the safety element is present on the belt framework, in particular, on the transverse strut, such that it can absorb and/or transfer tensile forces to which the belt framework, and, in particular, the transverse strut, is subjected, for example, in the event of a crash, wherein the tensile forces to which the transverse strut is subjected in the event of a crash have, for example, a main force component in the direction of travel. It is also conceivable for the safety element to be formed in abutment against the rear side of the transverse strut, in particular, along a horizontal extent between the first and/or the second fastening region and the vertical support.

It is also proposed that the safety element should be of strap-like design.

The safety element is preferably present in the form of a safety strap, e.g. of a metal strap, in particular, of a steel strap. The safety element or the safety strap has a width of, for example, between 5 and 40 mm, between 5 mm and 30 mm, between 10 mm and 25 mm or between 10 mm and 20 mm. For example, the safety element has a width of 5 mm, 10 mm, 12 mm, 14 mm, 16 mm, 18 mm, 20 mm, 25 mm, 30 mm, 35 mm or 40 mm, in particular, 15 mm. The safety element has a thickness of, for example, between 0.5 mm and 8 mm, between 1 mm and 6 mm or between 2 mm and 5 mm. The safety element has a thickness of, for example, 0.5 mm, 1 mm, 1.5 mm, 2 mm, 2.5 mm, 2.8 mm, 3.2 mm, 3.5 mm or 4 mm, in particular, the safety element has a thickness of 3 mm. The safety element has a length of, for example, between 200 mm and 1000 mm. In particular, the safety element has a length of approximately 640 mm. It is also conceivable for, in particular, the length of the safety element to be adapted in accordance with the configuration of the belt framework or the length of the transverse strut, in particular, of the vehicle seat.

It is, for example, the case that the safety element is designed such that it absorbs and/or transfers energy from a sudden force which acts at at least one end of the safety element. For example, the safety element is present in a state in which, when arranged in position, it can expand, stretch and/or buckle in the event of a crash, wherein in this case the safety element advantageously absorbs energy. It is also conceivable for the safety element to twist in the event of a crash. It is further conceivable for the safety element to be present in a kinked or twisted state, in particular, along its longitudinal axis, and, for example, to untwist in the event of a crash.

Furthermore, it is advantageous for the safety element to be designed in the form of a belt strap. This means that it is comparatively lightweight and cost-effective. The safety element is present, for example, in the form of a tensioning strap. For example, the safety element is designed in the manner of a strip, e.g. in the form of a woven-fabric strip. The safety element, in particular, the belt strap, is preferably present in a stable state such that it can absorb, and advantageously transfer, a comparatively high tensile force to which the safety element is subjected in particular along the longitudinal axis of the safety element. For example, the safety element is designed such that, when it has been arranged in position, it does not tear and/or rupture when subjected to a comparatively high tensile force, possibly in the event of a crash. The safety element is present, for example, such that, in the event of a crash, a tensile force to which it is subjected is transferred by it, along its longitudinal axis, up to a predetermined extent and, when the tensile force exceeds the predetermined extent, the safety element begins to absorb the tensile force, in particular, in addition to transferring it, by for example expanding.

In an advantageous configuration of the belt framework, the safety element has a zigzag-like cross section along its longitudinal axis. In a further advantageous configuration of the belt framework, the safety element has an undulating cross section along its longitudinal axis. The safety element is preferably present in a zigzag-like and/or undulating manner, as seen in a horizontal cross section, along its longitudinal axis. Furthermore, it has proven advantageous for the safety element to be rotated and/or kinked along its longitudinal axis, in particular, about the longitudinal axis. For example, the safety element is twisted along its longitudinal axis and about the longitudinal axis. This means that the safety element is designed such that it can absorb a comparatively large amount of energy, in particular, in the event of a crash, to which the safety element is subjected, for example, by tensile forces.

It is, for example, the case that, when it has been arranged on the belt framework, the safety element is present in an undulating and/or zigzag-like and/or twisted or kinked state along its longitudinal axis, in a region between the first and/or the second fastening region and the vertical support. Furthermore, the undulating and/or zigzag-like and/or twisted or kinked region of the safety element is installed so as to be, for example, spaced apart from the rest of the belt framework, in particular, from the transverse strut and/or the vertical support.

It has also proven advantageous, when the belt framework has been arranged on the vehicle seat, for a belt buckle of the passenger-restraint system to be arranged on the attachment element of the transverse strut and/or on the vehicle. It is preferably the case, when the belt framework has been arranged on the vehicle seat and/or on the vehicle, for a three-point-belt passenger-restraint system to be arranged on the belt framework. The attachment element is formed, for example, on the front side of the transverse strut. The attachment element is present on the belt framework preferably opposite a fastening region of the transverse strut, in particular, as seen in a horizontal direction. As a result, when the belt framework has been arranged in position, a tensile force can be directed away, e.g. starting from the safety belt of the passenger-restraint system, in particular, in the event of a crash, via a component of the passenger-restraint system, e.g. the belt buckle, to the attachment element and thus to the transverse strut. The advantageous arrangement means that the tensile force which acts through the safety belt is directed away, for example, from the transverse strut, via the fastening region, to the safety element.

Furthermore, it is advantageous for the safety element to be present on the transverse strut in a region between two vertically oriented connecting elements, wherein the connecting elements connect the transverse strut, e.g. a first transverse strut, to a further transverse strut, e.g. a second transverse strut, of the belt framework, wherein the further transverse strut is present on the belt framework such that, when the belt framework has been arranged on the vehicle seat and/or on the vehicle, a headrest is arranged on the further transverse strut. This increases the stability of the belt framework. The belt framework can have possibly two or more preferably identical transverse struts, wherein, for example, each transverse strut is connected to the one vertical support or, for example, to the plurality of vertical supports. It is, for example, the case that, when the belt framework has been arranged on the vehicle seat and/or on the vehicle, a belt retractor of the passenger-restraint system is installed on the second transverse strut.

The present invention further advantageously relates to a vehicle seat having one of the aforementioned embodiments of the belt framework and/or to a vehicle which comprises a belt framework according to one of the aforementioned embodiments.

BRIEF DESCRIPTION OF THE DRAWINGS

A number of exemplary embodiments will be explained in more detail with reference to the following schematic drawings, with information being given in relation to further details and advantages.

DETAILED DESCRIPTION OF THE INVENTION

A basic framework 1 according to the present invention comprises, inter alia, three vertical supports 2-4, a first transverse strut 5 and a second transverse strut 6, two connecting elements 7, 8, a fitting means 9, 10, a supporting foot 11, and a safety element in the form of a safety strap 12 (FIGS. 1 to 5).

When arranged on the basic framework 1, longitudinal axes of the three vertical supports 2-4 are present in a vertically oriented state. The vertical supports 2-4 are present in a state in which they are spaced apart from one another and, for example, arranged parallel one beside the other. The foot region 13 of the vertical supports 2-4 is provided with fitting means 9 in order to fasten the vertical supports 2-4 when they have been arranged on a vehicle (not illustrated), for example, in order to screw them to a vehicle floor 36. The transverse struts 5, 6 are advantageously present perpendicularly to the vertical supports 2-4 and are preferably connected to each of the vertical supports 2-4, in particular, in a non-releasable manner. For example, the transverse struts 5, 6 are welded to the vertical supports 2-4 at connecting locations 33-35. It is also conceivable for the transverse struts 5, 6 to be screwed and/or riveted to the vertical supports 2-4. The first transverse strut 5 advantageously has a rear side 23 installed on a front side 24 of the vertical support 2-4. When the belt framework 1 has been arranged on the vehicle, a surface normal of the front side 24 of the vertical supports 2-4 is advantageously oriented in a direction of travel F of the vehicle, in particular, in the direction of the front of the vehicle.

Figures 1, 2:
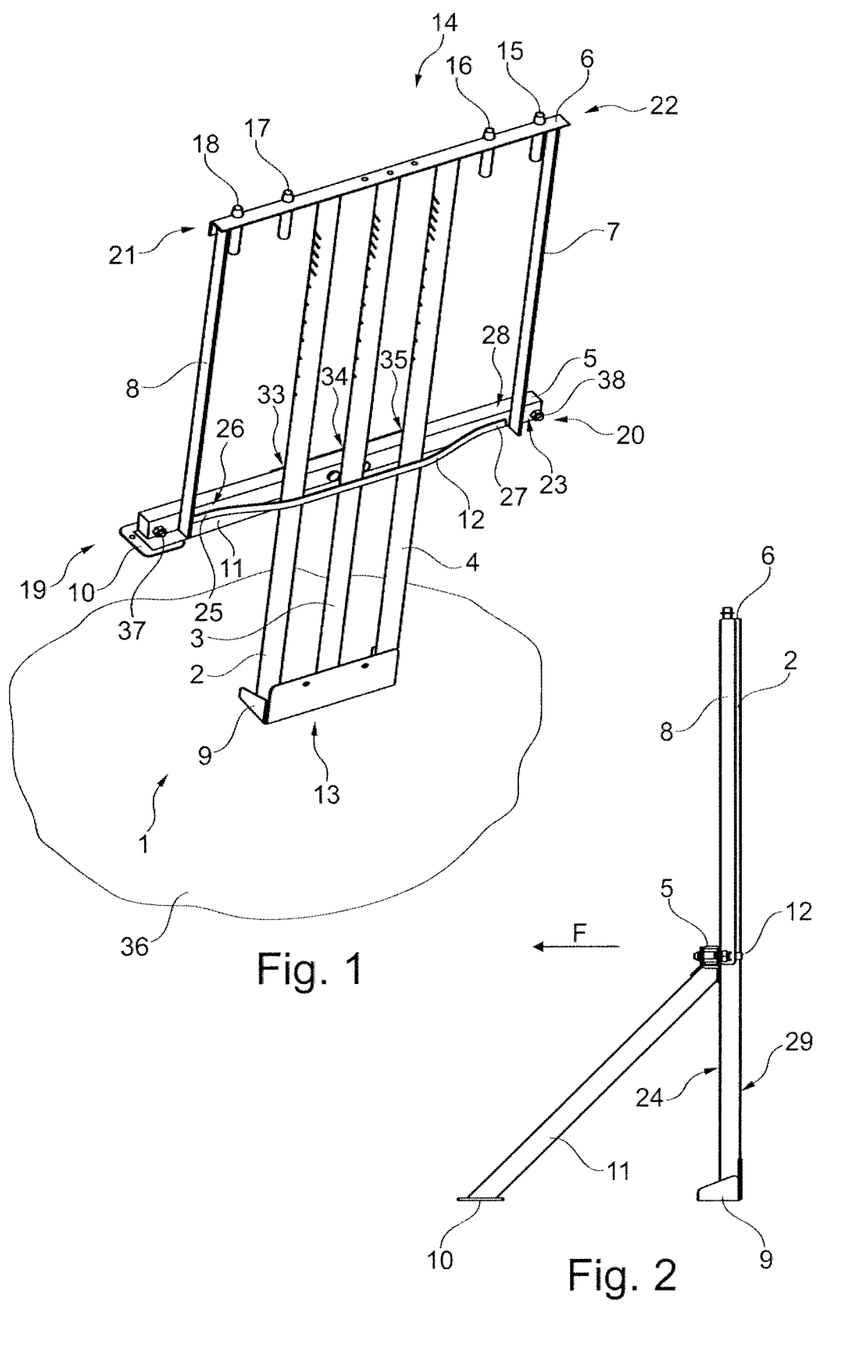
FIG. 1 shows a perspective view from the rear, as seen obliquely laterally from above, of a first variant of a belt framework according to the present invention with a first embodiment of a safety element.
FIG. 2 shows a side view of the belt framework according to FIG. 1.
Figure 3:
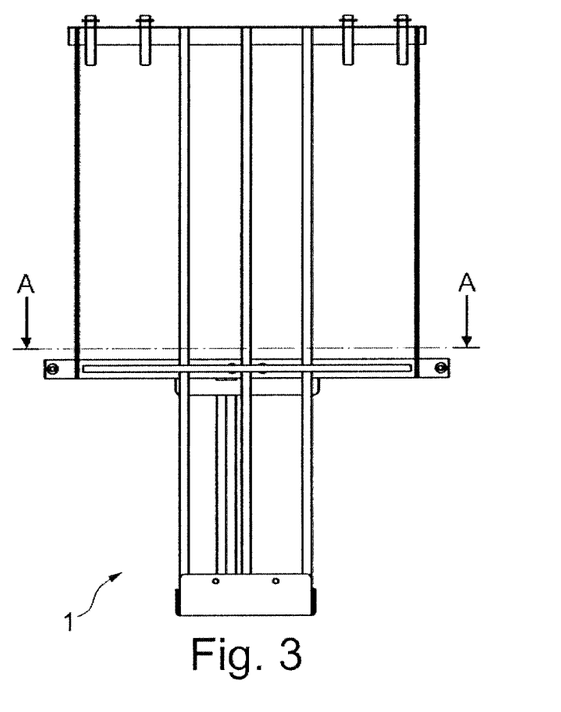
FIG. 3 shows a rear view of the belt framework according to FIG. 1.
Figure 4:
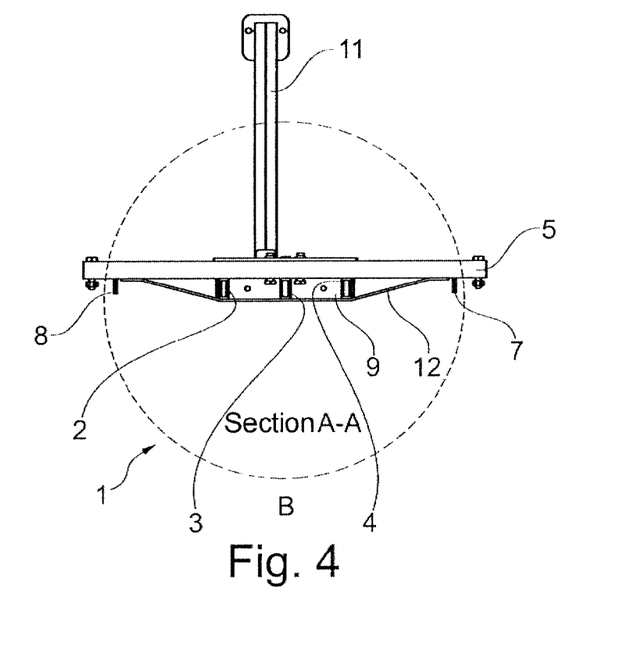
FIG. 4 shows a sectional view A-A of the belt framework according to FIG. 3, as seen from above.
Figure 5:
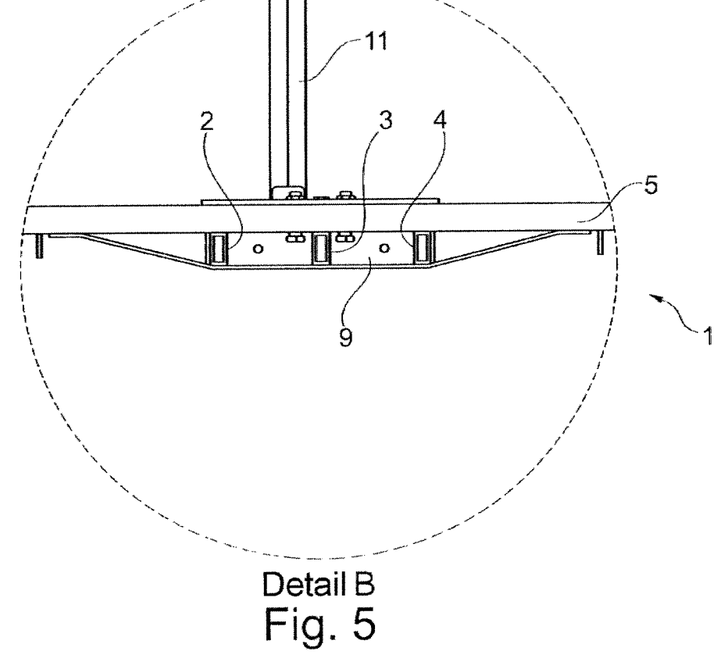
FIG. 5 shows an enlarged detail B of the section A-A according to FIG. 4.

The second transverse strut 6 is arranged, for example, on a head region 14 of one of the vertical supports 2-4 or of each of the vertical supports 2-4. Installation means 15-18 are formed on the second transverse strut 6 and are provided in order to receive, e.g. in pairs, a headrest (not illustrated).

The first transverse strut 5 is advantageously fastened on the vertical supports 2-4 approximately level with a seating surface of a vehicle seat, wherein the vehicle seat encompasses the basic framework 1. In particular, the first transverse strut 5 is formed, as seen vertically upward starting from the fitting means 9, a third of the way up the length of the vertical supports 2-4.

The connecting elements 7, 8 are present, for example, in a strap-like manner, e.g. in the form a steel strap. The connecting elements 7, 8 connect the first transverse strut 5 and the second transverse strut 6 to one another. The connecting elements 7, 8 are advantageously connected to the transverse struts 5, 6 in a non-releasable manner, e.g. are welded thereto. The connecting elements 7, 8 are oriented, for example, parallel to the vertical supports 2-4 and extend, for example, in the vertical direction. The connecting elements 7, 8 are advantageously provided to keep the transverse struts 5, 6 at a defined, for example, vertical distance apart from one another, in particular, in the event of a crash. It is preferably the case that the connecting elements 7, 8 connect ends 19-22 of the transverse struts 5, 6 to one another.

The safety strap 12 is preferably fastened on the rear side 23 of the first transverse strut 5. For example, the safety strap 12 has a first end 25 arranged on a first fastening region 26 of the first transverse strut 5 and has a second end 27 arranged on a second fastening region 28 of the first transverse strut 5. The safety strap 12 advantageously has its longitudinal axis running parallel to the first transverse strut 5, along a longitudinal axis of the first transverse strut 5, and therefore the first transverse strut 5, together with the safety strap 12, enclose the vertical supports 2-4, for example, in a sling-like manner in an, in particular, horizontal plane. When the safety strap 12 has been arranged on the belt framework 1, the ends 25, 27 of the safety strap 12 are advantageously fastened on the first transverse strut 5, between the spaced-apart connecting elements 7, 8. For example, at the first fastening region 26, the connecting element 8 and the first end 25 of the safety strap 12 are fixed one beside the other on the first transverse strut 5 and, at the second fastening region 28, the connecting element 7 and the second end 27 of the safety strap 12 are fixed one beside the other on the first transverse strut 5. The safety strap 12 is advantageously formed in abutment against a rear side 29 of the vertical supports 2-4.

It is also the case that fitting means in the form of a fastening screw 37, 38 are formed at the ends 19, 20 of the first transverse strut 5. When the belt framework 1 has been arranged on the vehicle seat, a safety component of a passenger-restraint system, e.g. a belt buckle, is fastened on the fastening screws 37, 38.

Figure 6:
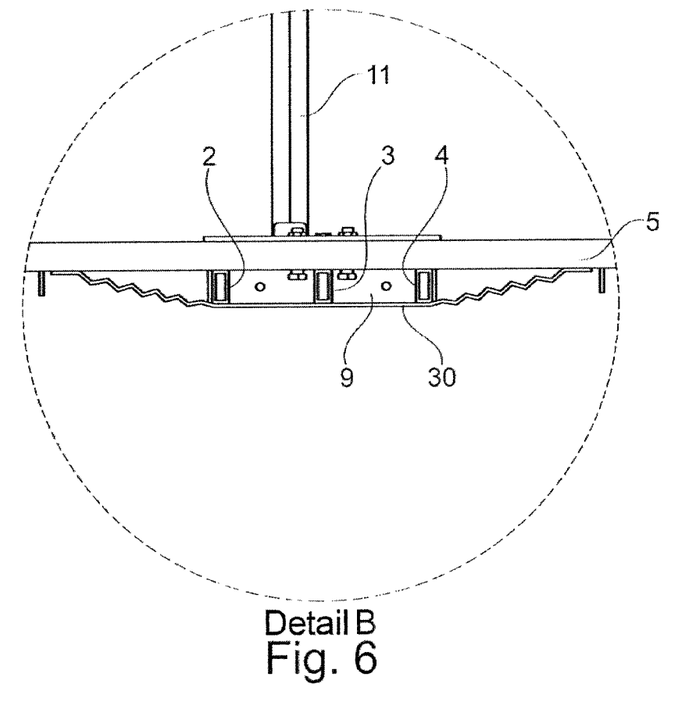
FIGS. 6 to 8 show an enlarged detail B of further variants of a belt framework, corresponding to section A-A through the first variant of the belt framework according to FIG. 4, with further variants of a safety element which differ from the embodiment according to FIG. 1.
Figure 7:
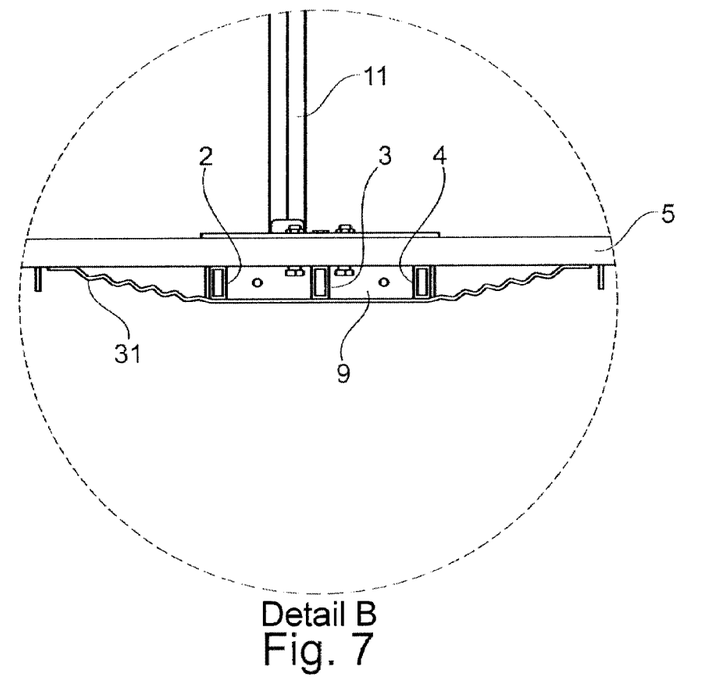
Figure 8:
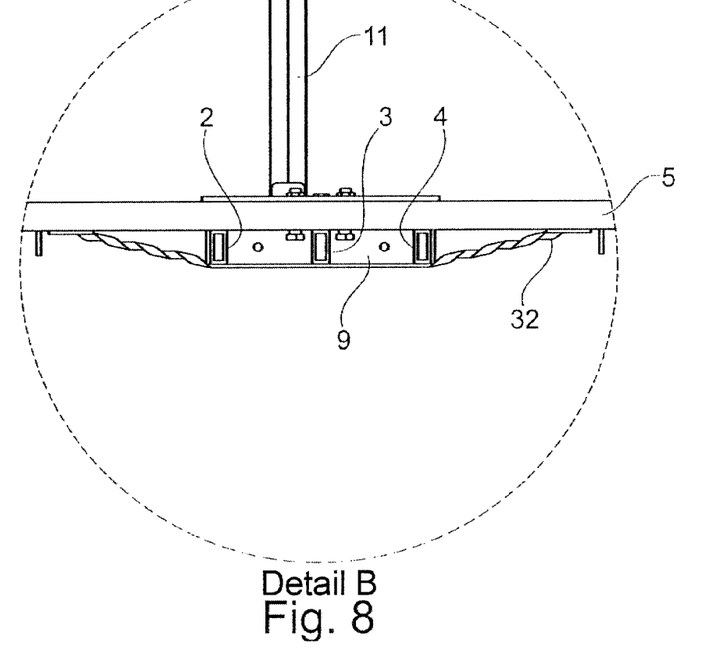

FIGS. 6 to 8 illustrate further variants of a safety element in the form of a safety strap 30, which has a zigzag-like progression in cross section along its longitudinal axis (FIG. 6), in the form of a safety strap 31, which has an undulating progression in cross section along its longitudinal axis (FIG. 7), and in the form of a safety strap 32, which has a twisted or kinked progression along its longitudinal axis (FIG. 8).

LIST OF REFERENCE SIGNS

1 Belt framework
2-4 Vertical support
5-6 Transverse strut
7-8 Connecting element
9-10 Fitting means
11 Supporting foot
12 Strap
13 Foot region
14 Head region
15-18 Installation means
19-22 End
23 Rear side
24 Front side
25, 27 End
26, 28 Fastening region
29 Rear side
30-32 Safety strap
33-35 Connecting location 36 Vehicle floor
37, 38 Fastening screw

The invention claimed is:

1. A belt framework for a vehicle seat or a vehicle-seat bench, wherein the belt framework comprises a vertical support and a horizontally running transverse strut, wherein the transverse strut is arranged on the vertical support, wherein a component of a passenger-restraint system is fastened on an attachment element of the transverse strut when the vehicle seat and the belt framework are in an assembled state, wherein the belt framework comprises a safety element present on the transverse strut, along a longitudinal axis of the transverse strut, wherein the safety element, together with the transverse strut, encloses the vertical support.

2. The belt framework for a vehicle seat as claimed in claim 1, wherein two spaced-apart fastening regions are present on the transverse strut, wherein the safety element is connected to the transverse strut at the fastening regions.

3. The belt framework for a vehicle seat as claimed in claim 1, wherein, when the belt framework has been installed on a vehicle seat and/or a vehicle, the safety element is present on a side of the transverse strut which is opposite to the seating direction F of the vehicle seat and/or to the direction of travel of the vehicle.

4. The belt framework for a vehicle seat as claimed in claim 1, wherein the safety element is of strap-like design.

5. The belt framework for a vehicle seat as claimed in claim 1, wherein the safety element is designed in the form of a belt strap.

6. The belt framework for a vehicle seat as claimed in claim 1, wherein the safety element has a zigzag-like cross section along its longitudinal axis.

7. The belt framework for a vehicle seat as claimed in claim 1, wherein the safety element has an undulating cross section along its longitudinal axis.

8. The belt framework for a vehicle seat as claimed in claim 1, wherein the safety element is rotated and/or kinked along its longitudinal axis.

9. The belt framework for a vehicle seat as claimed in claim 1, wherein, when the belt framework has been arranged on the vehicle seat, a belt buckle of the passenger-restraint system is arranged on the attachment element of the transverse strut and/or on the vehicle.

10. The belt framework for a vehicle seat as claimed in claim 1, wherein the safety element is present on the transverse strut in a region between two vertically oriented connecting elements, wherein the connecting elements connect the transverse strut to a further transverse strut of the belt framework, wherein the further transverse strut is present on the belt framework such that, when the belt framework has been arranged on the vehicle seat and/or on the vehicle, a headrest is arranged on the further transverse strut.

11. A vehicle seat having a belt framework as claimed in claim 1.

12. A vehicle having a vehicle seat as claimed in claim 11.

13. The belt framework for a vehicle seat as claimed in claim 2, wherein the safety element is connected to the transverse strut in a non-releasable manner.

14. The belt framework for a vehicle seat as claimed in claim 8, wherein the safety element is rotated and/or kinked about its longitudinal axis.

* * * * *